March 28, 1967

C. E. LINKOUS 3,311,764

DYNAMOELECTRIC MACHINE WITH A SINGLE
WIRING CONTROL SUPPORTED UNIT

Filed Jan. 2, 1964

INVENTOR.
Clovis E. Linkous,
BY John M. Staudt
Attorney.

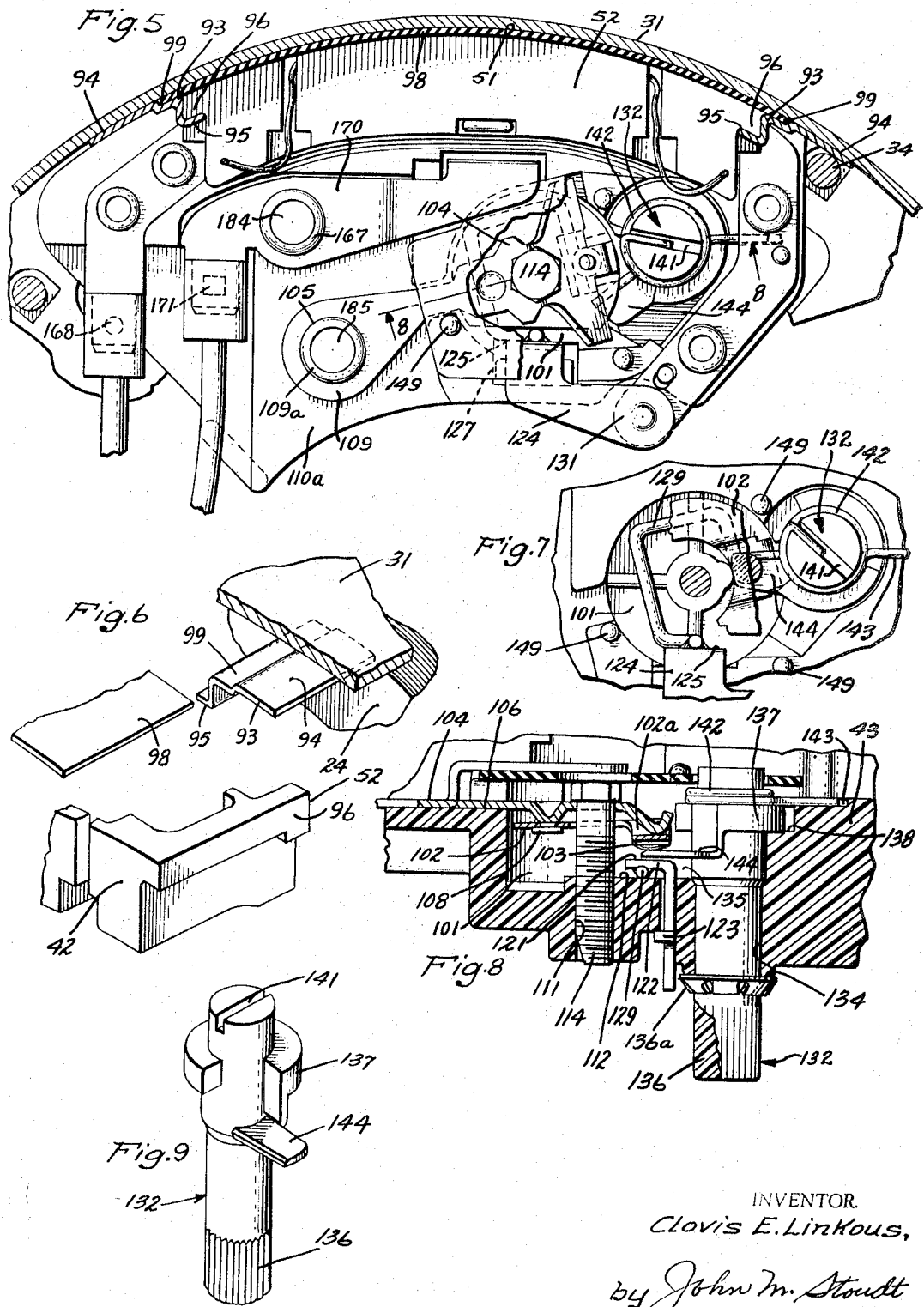

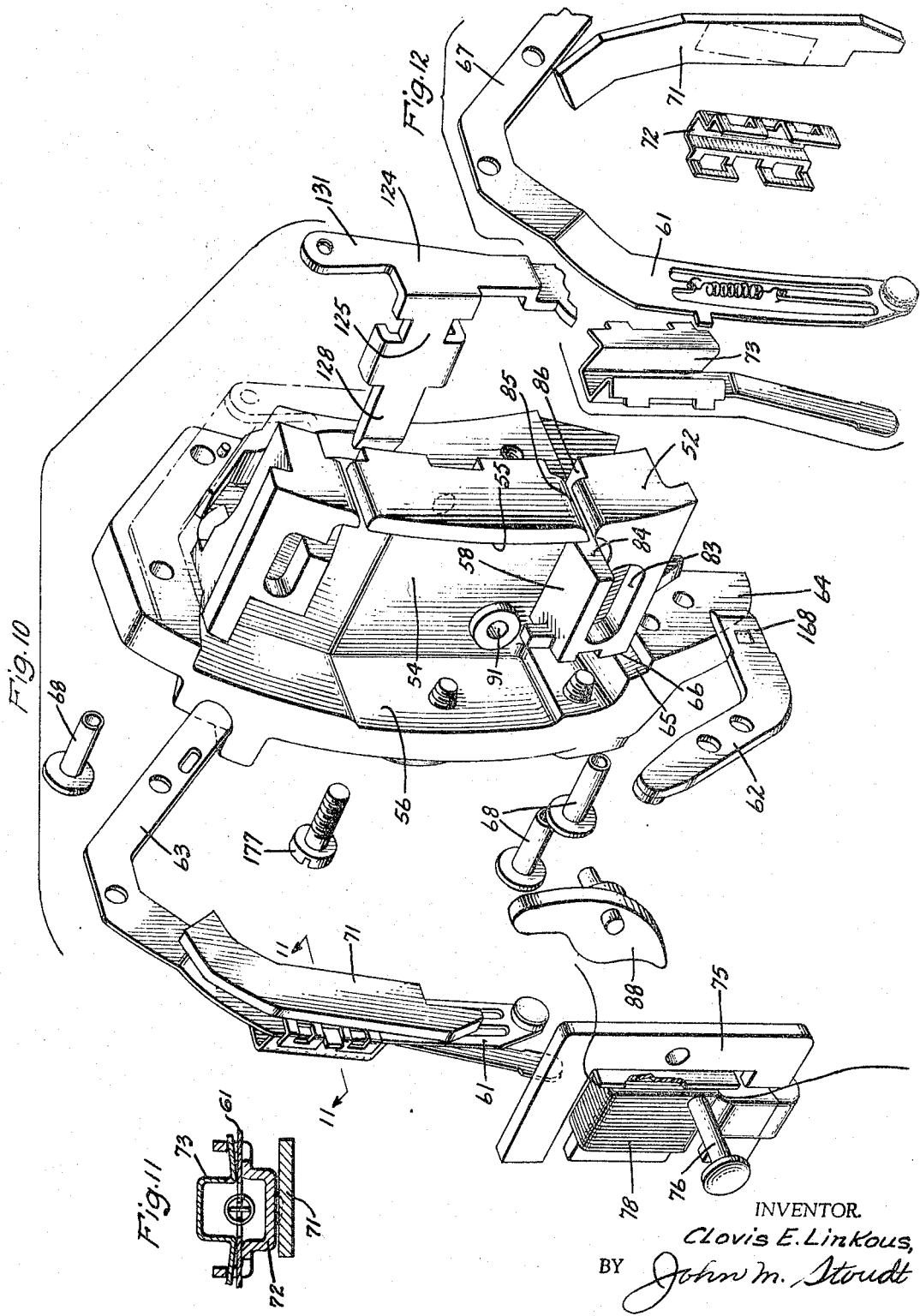

United States Patent Office 3,311,764
Patented Mar. 28, 1967

3,311,764
DYNAMOELECTRIC MACHINE WITH A SINGLE
WIRING CONTROL SUPPORTED UNIT
Clovis E. Linkous, Fort Wayne, Ind., assignor to General
Electric Company, a corporation of New York
Filed Jan. 2, 1964, Ser. No. 335,243
5 Claims. (Cl. 310—68)

This invention relates in general to dynamoelectric machines and more particularly to such machines of the single phase type incorporating stator winding controls.

In the construction of dynamoelectric machines, particularly single phase induction motors having an auxiliary or start winding, a switch is commonly employed to disconnect the winding when the motor has come up to speed. One such switch is of the relay type and has been conventionally mounted either externally to the motor or attached to one of the end frames within the motor. In the latter case, the switch is usually disposed in the air flow path within the motor and there has been a tendency for dirt and other foreign matter to collect between the switch contacts and other switch components which adversely affects the operation of the switch.

Motors of the above described type are frequently provided with a thermal overload switch device or motor winding protector for which a mount is also furnished. In addition, a terminal board having terminal studs for connecting the windings, switch, and overload device in circuit with an external power source is conventionally mounted within the motor. This combination in the past has necessitated relatively long leads and a large number of connections between the individual devices, i.e., the switches, motor windings, and the terminal board. In view of the large number of parts required and the difficulty experienced in installing the individual devices and in making the necessary electrical connections, the foregoing arrangement was relatively expensive to manufacture. In addition, by virtue of the construction under consideration, a motor frame of unusually long axial length was required in order to house the various devices, adding further expense in the fabrication of the machine. Moreover, since the various devices were exposed to the air flowing through the motor, once installed, and consequently collected dirt and the like, in many cases there was a need to disassemble prematurely the devices from the motor for cleaning purposes. This, of course, adds cost to the maintenance of the motor.

It is, therefore, a general object of the present invention to provide a dynamoelectric machine with an improved winding control supporting arrangement, and it is a more specific object to provide such arrangement which overcomes the undesirable features and deficiencies mentioned above.

It is another object of the present invention to provide a dynamoelectric machine with an improved winding control support unit which permits a reduction in the number of connections and parts normally required to mount terminals, an overload device, and a winding switch, and results in a low cost unit.

It is a further object of the present invention to provide a dynamoelectric machine with a low cost winding control support unit which is easily assembled together, readily and efficiently installed in the machine as a single unit, and simply connected in the winding circuit, the unit being of such size and construction that it permits a decrease in the overall axial length of the machine as compared with past arrangements.

It is still another object to provide a unitary winding control support which mounts terminals and is adapted to house an overload switch and winding switch, devices protecting the latter two devices from exposure to dirt and other foreign matter.

It is another object of the present invention to provide a winding control support for use in a dynamoelectric machine which is versatile in nature and allows its use with or without an overload protector.

In carrying out the objects of the present invention in one form, I provide a dynamoelectric machine having a start and main winding with an improved single winding control unit mounted adjacent the stator and machine frame. The unit includes a generally L-shaped support formed of cured thermosetting epoxy resin having the end of one leg disposed adajcent the stator side face between the winding end turns and the inner surface of the end frame. This leg includes a chamber, remote from the winding end turns which mount a start winding switch. An electrical insulator cover is sandwiched between the leg and chamber to form an enclosed compartment for electrically and mechanically shielding the switch from other machine components.

The other leg, depending from the shell towards the rotor shaft is formed with a chamber opening toward the stator for accommodating an overload switch in series with the power supply line for protection purposes. The leg has a cavity in communication with the overload switch cavity which rotatably mounts an electrical insulator post having an insulating wedge biased toward the normally closed contacts of the overload switch. Upon operation of the switch to the open position, the wedge is rotated between the contacts to prevent their closing again. The post has a handle extending beyond the face of the leg remote from the stator for manually resetting the wedge outside the contacts, allowing the switch to close. A cover encloses both the chamber and communicating cavity to prevent the entrance of dust and dirt into the area. The support may be utilized with or without either the overload switch or the insulator post, depending upon the particular machine application, without adversely affecting the protection afforded to the start winding switch.

The terminals for connecting the two switches and windings to power input lines are carried upright by the support on the face remote from the overload switch chamber and are readily accessible from externally of the motor. In addition, the terminals for the start winding are positioned at a common location by the use of a simple electrical conducting linkage arrangement. Other structural features and advantages of the unit will become apparent as the description proceeds.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:

FIG. 5 is a partial and enlarged view taken along line 5—5 in FIG. 1 to show further details of the control unit and the preferred manner in which it is mounted within the motor frame;

FIG. 6 is an enlarged fragmentary view in perspective of the manner in which one side of the control unit is mounted to the machine frame;

FIG. 7 is a fragmentary view, partially broken away, showing the thermal overload switch and manual reset components of FIG. 6, with the switch contacts being held in open circuit by the reset element;

FIG. 8 is a view taken along line 8—8 in FIG. 6 to show further details of the overload and manual reset components;

FIG. 9 is a view in perspective of the manual reset element seen in FIG. 8;

FIG. 10 is an enlarged partially exploded view in perspective of the control support and one type of relay switch which may be satisfactorily employed in the control support of the present invention;

FIG. 11 is a view of the relay armature assembly taken along line 11—11 in FIG. 10;

FIG. 12 is a view in perspective of the movable armature relay switch assembly shown in FIG. 10;

Figure 13:
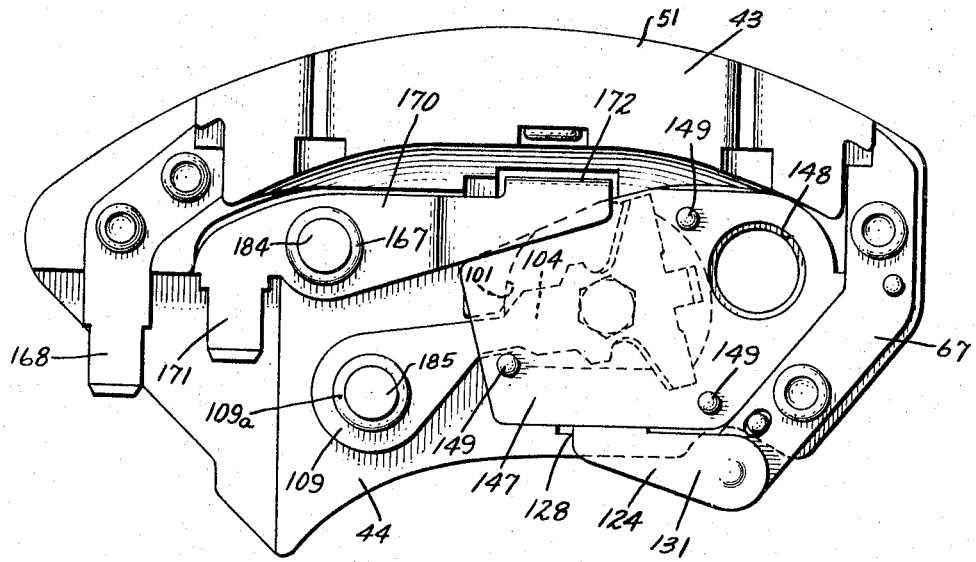
Figure 14:
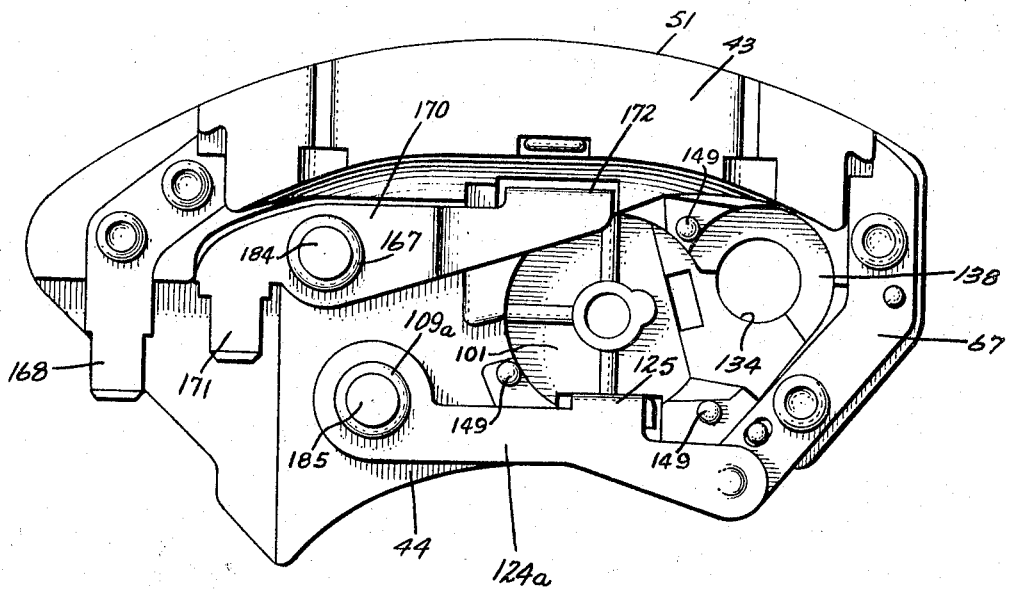

FIG. 13 is a view similar to that of FIG. 5 revealing the control support of the preferred embodiment mounting the thermal overload switch seen in FIGS. 5–8 for automatic reset operation; and FIG. 14 is a view similar to FIG. 13 showing the control support of the preferred embodiment having an arrangement for connecting the windings and switch relay directly to terminals for those applications which do not require thermal overload devices.

Figure 1:
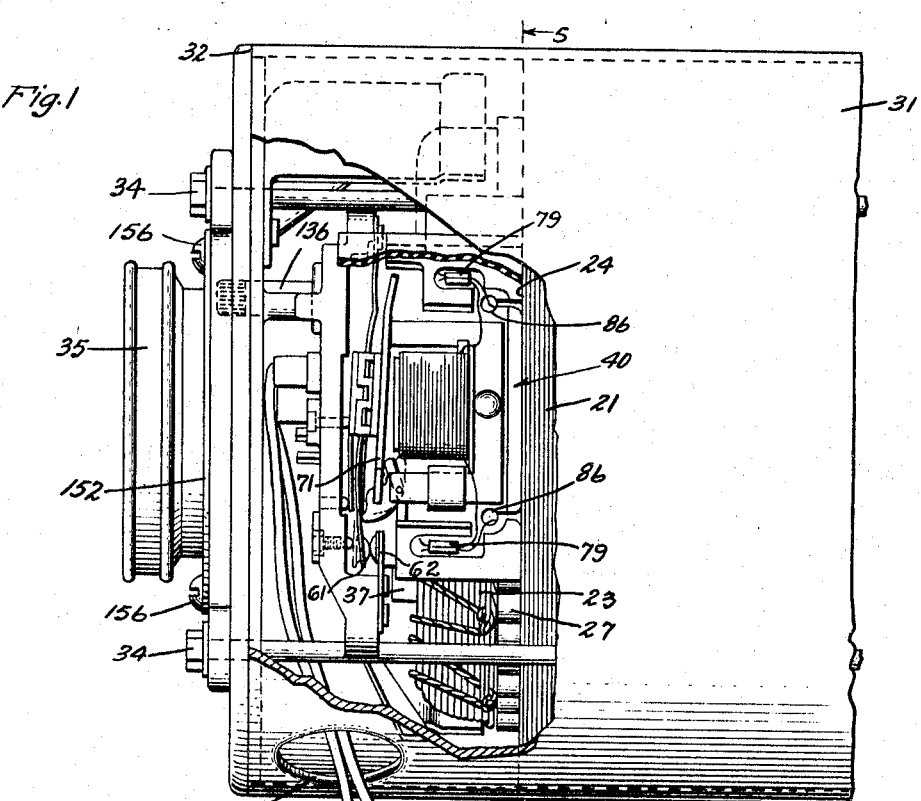
FIG. 1 is a fragmentary plan elevational view, partly broken away, showing one end of a dynamoelectric machine incorporating the preferred embodiment of the present invention.
Figure 2:
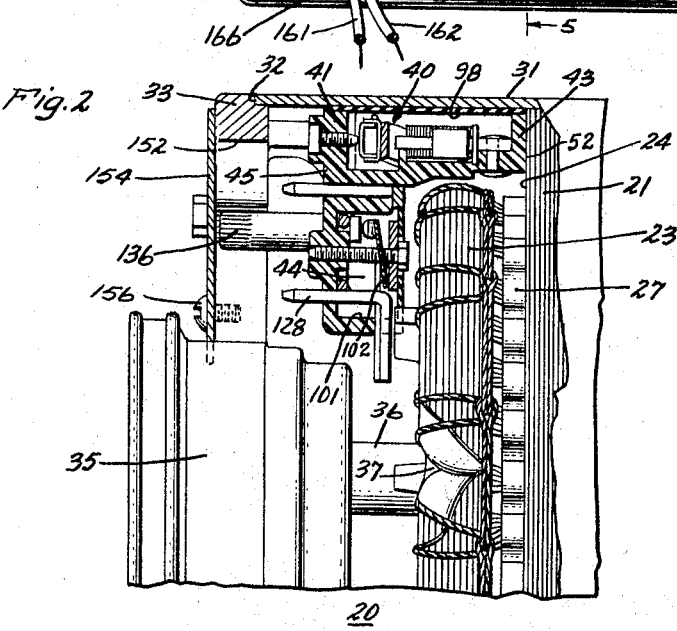
FIG. 2 is a fragmentary side elevational view, partially broken away and in section of the same dynamoelectric machine end illustrated in FIG. 1 to show further details of the winding control unit seen in FIG. 1.
Figure 4:
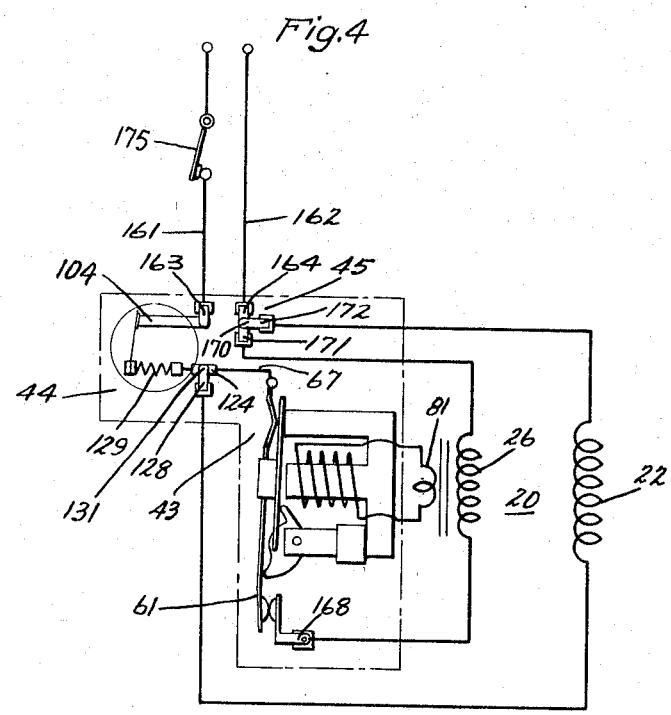
FIG. 4 is a schematic representation of the winding control circuit for the dynamoelectric machine of FIG. 1.

Turning now to the drawings in more detail and in particular to FIGS. 1, 2, and 4, the preferred embodiment has been shown in connection with a single phase induction electric motor 20 of the resistance split phase type. The motor includes a laminated stator core 21 of standard construction, formed by a stacked plurality of laminations punched from relatively thin magnetic contour. A distributed main or running winding 22 is arranged in stator winding accommodating slots in the usual way with winding end turns 23 projecting beyond each side face 24 of the core. For reasons of simplicity of illustration and brevity of description, only one side of motor 20 has been shown in FIGS. 1 and 2. An auxiliary or start winding 26 is displaced 90 electrical degrees from the main winding in the slots for the usual reasons. Each winding is wound with a number of turns of insulated wire; e.g., magnet wire, to form winding poles in the well known manner, the windings being insulated from the core by standard slot lines 27. Both windings are adapted to be energized during starting conditions, while only the main winding is excited for running operation as will be explained more fully hereinafter.

The stator core is mounted within a cylindrical central shell 31, fabricated of sheet material like steel, of a motor frame, as by welding the stator to the shell at angularly spaced apart locations. Shell 31 extends axially beyond winding end turns 25, terminating on each side in an edge 32 which is suitably connected to cast end shield 33 or an end frame. The connection shown in FIGS. 1 and 2 is of the rabbet type, with a number of angularly spaced apart through bolts 34 securing the parts firmly together. Each end shield incorporates a central hub 35 mounting bearing for rotatably supporting one end of a shaft 36, which in turn, carries a conventional rotor (not shown) having a cast squirrel cage type winding formed with end rings partially seen and indicated in FIGS. 1 and 2 by numeral 37.

The illustrated motor of the exemplification incorporates a single winding control support unit, generally identified by numeral 40, which is constructed in accordance with the preferred embodiment of the present invention. As shown in FIG. 2, it has a single-piece electrically insulated casing or support 41, preferably molded of thermo-responsive material such as thermosetting epoxy resin and integral yet electrically separated generally formed into the shape of an L to provide three interrelated supporting sections, a start winding switch accommodating section 43, an overload switch mounting section 44 and a terminal supporting section 45. As will be more clearly developed hereinafter the interrelationship of these sections to one another as well as to other motor components achieves among other beneficial results a reduction in the number of electrical connections required, protection for the switch components, and versatility in use.

The start winding switch accommodating section 43 which is formed by one of the legs of the support, will be considered in connection with FIGS. 2 and 10. This section of generally block-like construction has an outer arcuate surface 51 complementary in configuration to the inner surface of motor shell 31. The free end 52 of the section is generally flat or planar for abutment against stator end face 24, intermediate the shell and winding end turns 23. A chamber or switch accommodating cavity is provided at surface 51, remote from winding end turns 23, the chamber being defined by bottom wall 54, inner and outer walls 55, 56 (as viewed from the motor stator) and side walls 57, 58. This chamber is especially suitable for supporting the switch relay components of the switch relays disclosed and claimed in my U.S. Patents 3,256,402 and 3,256,403, both filed January 2, 1964 and assigned to the same assignee as the present invention. However, it will be recognized from the following description that the switch section 43 can be modified to mount other switches than those mentioned above and still retain the benefits of the present invention. Consequently, the switch relay disclosed in Patent 3,256,403 is shown in the drawings by way of example only.

FIGS. 1, 10, 11, and 12 reveal the switch relay details of the exemplification, a more complete description of the relay details and operation being set forth in my Patent 3,256,403. Briefly described, a pair of switch contact blades 61 and 62 are supported by enlargements 63 and 64 respectively, which are integrally joined to chamber wall 56 by a stepped construction through opening 66 indicated by number 65. Blade 61 is the movable blade having its blade extension 67 rigidly attached to enlargement 63 by a pair of rivets 68. In a like manner the stationary contact blade is riveted to enlargement 64 such that blades 61 and 62 extend towards one another for cooperation. Movable blade 61 has a snap action and bracketed arrangement cooperatively connected to a relay armature 71 by opposed brackets 72 and 73. This armature is connected above a core 75 mounted with its yoke section disposed adjacent wall 55 by a rivet 76 projecting through the yoke section and into the wall 54 of the chamber. The core accommodates an energizing coil 78 suitably attached by crimped connectors 79 to the terminations of a sensing coil 81 (FIG. 4) carried by the stator in the axis of the start winding. A recess 83 is formed in the section outwardly of walls 57 and 58 with channels 84 communicating between the recess and the chamber for passage of the relay coil wire extremities to the connectors. In addition, wall 55 has slots 85 connecting an opening 86 formed in wall 54 to permit motor winding extremities to permit the assembly of the end sensing coil to the relay coil and to locate the sensing coil wire extremities away from the stator for reasons of protection. Slots 85 allow this assembly while openings 86 provide the protection when the unit is in place. Wall 55 also furnishes the support for an impact mechanism 88, which has a shaft 89 situated in bearing hole 91.

Support 41 is mounted in the motor and carried by shell 31 in the manner shown by FIG. 2 with surface 52 abutting against the side face 24 of the stator core, adjacent the inner surface of shell 31. The illustrated means for achieving this mounting is shown in FIGS. 5 and 6. A pair of spaced apart and opposed, generally Z-shaped, elongated brackets 93 are attached to the inner surface of the shell at one end 94 by welding or the like and extend axially away from the stator. The brackets have recesses next to shell 31 which, along with the inner surface of shell 31, provide opposed narrow channels 99 for accommodating a curved sheet of electrical insulation 98 such as fiberboard conforming in contour to the shell. The brackets are bent just below the recesses to furnish opposed flanges at their free ends for fitting beneath complementary shoulders 96 made integral with support section 43 and extending laterally away from that section. The flanges serve to hold support 41 firmly against insulation 98 which is sandwiched between shell 31 and support 41 and covers the start winding switch chamber in section 43 thereby shielding it, both electrically and physically. Support unit 41 is easily installed before the end frame 33 is attached to shell 31 merely by sliding insulator 98 into the bracket channels near the shell and then pushing the support shoulders 96 along the opposed bracket flanges until surface 52 rests against the stator. When end frame 33 is fastened to shell 31, the unit is held in the brackets, between the stator and the end frame and thus the axial length of the motor beyond the stator is established by the length of support 41. It will be seen that in its assembled relation to the motor, the start winding switch is supported away from the winding end turns 23 (FIG. 2) in an enclosed compartment in which the switch contacts are protected from exposure to dirt and foreign matter and the switch is electrically isolated by support 41 and insulator 98.

Now referring to section 44, and to FIGS. 2, 5, 7, and 8, an overload switch receiving chamber 101 opens toward the winding end turns on the other leg of support 41. This chamber is constructed, by way of example, to house an overload switch having similar switch components to that disclosed in Patent No. 2,771,528 issued to D. E. Moran on Nov. 20, 1956. A bimetal element 102 is provided having a substantially O-shaped configuration (FIG. 8) with an indentation 102a mounting a movable contact 103 on its underside. The indentation prestresses the bimetallic element 102 to provide the requisite snap action in response to temperature changes. A mounting member 104, formed of relatively thin strip conductive material such as steel, is provided over element 102, with a portion 105 received in support recessed seat 106 communicating with the chamber. A point 108 of member 104 adjacent the edge of element 102 is secured to an indentation in moutning member as by spot welding.

A terminal portion for movable contact 103 is formed on the extreme end portion 109 of member 104 which extends beyond recess 106 and is riveted to outer surface 110 of support section 44 which faces the motor end turns 23 in the assembled position of unit 40. Hollow, electrically conductive rivet 109a (FIG. 5) attaches portion 109 firmly to surface 110a. Mounting member 104 has an opening in the center thereof and a threaded hole 111 (FIG. 8) is furnished through the bottom wall 112 of the chamber, extending to support section 44. A suitable screw 114 is seated over the opening in member 104, projects down through it and into thread hole 111 for mounting that end of member 104.

The stationary contact 121 with which contact 103 cooperates, is mounted on one leg portion of an L-shaped member 122 which projects through an opening formed in the bottom wall 112 of the overload chamber. The other leg portion is locked in place by a number of ears 123 bent over after member 122 has been inserted into the opening. The terminal for the stationary contact, unlike that shown in the aforesaid patent, is a generally Z-shaped conductor strip or link of metal 124 shown in FIG. 5 which has one portion 125 projecting into the chamber and through an opening 127 in the bottom to form an external male terminal post 128 (FIG. 2) upstanding from terminal section 44. Here, again, suitable ears on the terminal member may be bent over beyond opening 127 after assembly to lock the part in place. The other end 131 of strip 124 is connected to blade extension 67 of the movable contact for the switch relay. Stationary contact 121 is electrically connected to link 124 within the chamber through a suitable serpentine heater 129, joined at each end by brazing or the like to contact 121 and link portion 125 respectively. This heater is in heat transfer relation with bimetallic element 102. The thermal overload device is responsive to excessive current as well as to excessive ambient temperature and will open with a snap action when a preselected adverse temperature condition has been reached by the motor.

In order to make the illustrated overload device manually resettable, support 41 mounts a rotatable, spring loaded single piece electrical insulator 132, shown in FIGS. 5, 7, 8, and 9, which may be made of any suitably hard insulating material such as molded thermo-setting plastic. It includes a cylindrical stepped post accommodated in a complementary hole 134, extending into a cavity 135 opening into the overload chamber in the vicinity of contacts 103 and 121. The post terminates at one end beyond terminal section 44 in a serrated handle section 136 for manual operation and carries an integral radial enlargement 137 seated on shoulder 138 of cavity 135. The insulator is held in place by a nut 136a engaging the outer surface of section 45. A transverse slot 141 formed in the extreme end of the insulator receives one end of a coil spring 142 with the other end being held in grooves 143 near shoulder 138 to provide the requisite compression support for the arrangement. The spring has several convolutions wrapped around the insulator post under compression for this purpose. A wedge 144 made integral with, but beneath, enlargement 137, is adapted to be held against contacts 103, 121, in their closed position (FIG. 5).

Upon opening or separation of the contacts, as will occur under adverse temperature operating conditions of the motor, the spring 142 turns insulator 132 from the position shown in FIG. 5 to that of FIGS. 7 and 8 where wedge 144 becomes disposed between the rotation of the contacts to maintain them in the open circulated position. A wall of the chamber stops the wedge and retains it between the contacts. As will be seen from FIG. 4, this disrupts the circuit to the start and main windings to stop the operation of the motor. Once the circumstance causing the adverse temperature condition has been corrected, the switch contacts may be closed merely by manually rotating the insulator to the extended position shown in FIG. 5, outwardly of contacts 103, 121, and the contacts will snap closed.

An electrical insulator cover plate 147, best seen in FIGS. 5 and 13 is employed to cover the overload and insulator cavities, with an aperture 148 permitting the extreme end of the insulator to pass through the cover. Suitably provided studs 149, made integral with section 44 and projecting outward from its upper surface, form the means to hold the cover firmly over the cavities. This cover is installed after the overload components and insulator 132 have been assembled in place. It therefore prevents dirt or other foreign matter from entering the cavities and holds the respective ends of spring 142 in slot 141 and groove 143. Automatic resetting of the overload device may readily be obtained by simply removing insulator 132 from the support and permitting the snap acting switch components to trip and reset in automatic response to the surrounding ambient temperature and overload current of the motor. Under these circumstances, the cover plate may be made imperforate, if desired.

In the illustrated embodiment of support unit 40, certain terminals which control the winding circuit are conventionally located where they are most accessible for easy winding. In addition, the aforedescribed locations of the switch relay and overload switch permits the use of common terminal to make safe connections. More specifically, terminal section 45, formed on the same depending leg as the overload supporting section 44, but remote from the interior of the motor, is exposed to the exterior of the machine. A flanged opening 152 furnished in end frame 33 permits access to terminal section 45 as well as to the handle of insulator 132 for resetting the overload device. A suitable removable cover or plate 154 may be utilized to enclose the opening, screws 156 being used to mount the cover over the opening.

Power leads 161, 162 which enter the motor through conduit opening 166 in frame 33 (FIG. 3) are seated in recesses 173 and 174 formed in section 45. The manual power control switch for the motor is indicated by numeral 175 in line 161 as seen in FIG. 4. These line terminals are each provided in the form of an L with the terminals upstanding from the spaced apart recesses to provide an electrical barrier therebetween. Terminal leg 163a of terminal 163 is secured to the support by hollow electrically conducting rivet 109a which, as previously mentioned, also holds portion 109 of the overload switch mounting member. The other line terminal 164 similarly has its leg 164a attached in place by a hollow electrically conducting rivet 167 extending through the support material. Hollow rivets are preferred since screws 184 and 185 may be received in them for making an alternate type connection with line 161, 162. A generally Z-shaped terminal strip 170 is held by rivet 167 on the side of support 41, remote from section 45 such that one of its ends 171, formed into a male quick-connect terminal, is located next to relay switch terminal 168 for convenience of making the connections to the start winding. The other end of strip 170 enters an opening communicating with section 45 and provides an upstanding male quick-connect terminal 172 disposed near terminal 128. Consequently, these two terminals can be readily utilized for connecting main winding 22 to the power lines, the manual control for the motor. If reverse rotation of the motor is desired, the necessary change of connections can be made easily by reversing or interchanging the main winding connections at terminals 128, 172.

Figure 3:
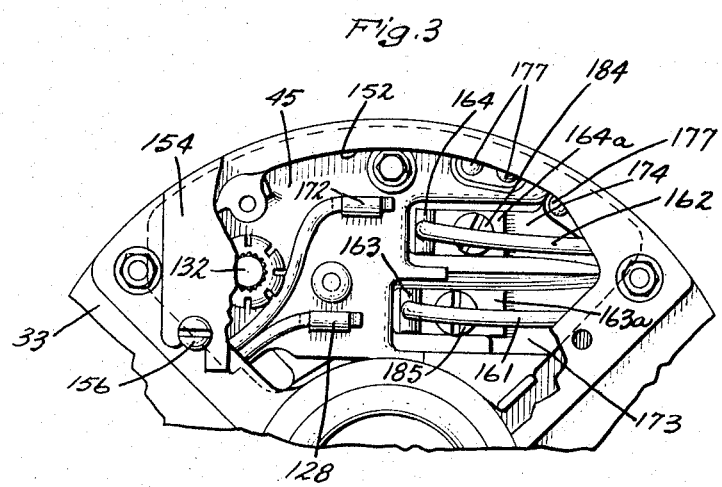
FIG. 3 is a fragmentary end view, partly broken away, of the machine end of FIG. 1 to reveal details of the terminal section of the control unit.

From FIGS. 3 and 4 and the foregoing discussion, it will be appreciated that in support unit 40, the line lead connections, main winding lead connections, and overload switch insulator handle are all easily accessible from end frame opening 152. In addition, the start winding terminals 168 and 171 have a common and unobstructed location, facilitating their connection with the start winding. Moreover, calibrating screws 177 for adjusting the net force on armature or switch relay may also conveniently extend from terminal section 45, through the support 41 and into the chamber accommodating the relay in the other leg of support 41. The heads of these screws can be reached at a location common to the one and main winding terminals without difficulty.

The manner in which the unit mounts the start winding switch and overload switch also permits simple and common interconnections between the components of the start and main winding circuits and allows versatility in use. As to the interconnection benefits for example, short electrical conducting strip or link 124 makes a common connection for a side of the start winding, the overload switch (contact 121), and the start winding switch (blade 61).

If it is desired to eliminate the use of the overload switch entirely, unit 40, as shown in FIG. 14, may incorporate a strip 124a extending between movable switch blade extension 67 and hollow rivet 109a. Even with the overload switch cover parts, and insulator 132 omitted from support 41, the protection against influx of dirt or the like and isolation of the start winding switch is still provided by the unit. Moreover, strip 170, the common and convenient connecting link for attaching the other ends of the start winding and main winding to the line can still be utilized without modification whatsoever.

Thus, the unit has versatility of use. All of the foregoing features and advantages may be attained at low cost and ease of manufacture, assembly, and installation as well as allowing a decrease in the overall axial length of the motor over other arrangements known to me.

While in accordance with the patent statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A dynamoelectric machine comprising a frame, a stator mounted within said frame and carrying start and main windings having end turns projecting beyond the side faces of said stator, a single winding control unit arranged within said frame, said unit having a single piece generally L-shaped support formed of hardened electrically insulating material, one leg of said support extending toward one side face of said stator between said winding end turns and frame, bracket means securing said support to said frame, said one leg having a chamber opening toward said frame, a start winding switch mounted within said chamber having first and second contacts and being insulated from said frame, the other leg of said support depending toward the axis of the machine axially beyond the associated end turns, said other leg including a chamber opening toward said stator, an overload switch mounted within said chamber having a pair of normally closed contacts, a manual reset insulator post rotatably carried by said other leg and having an insulating wedge normally biased toward said contacts, a cover enclosing said overload switch chamber, said post terminating in a handle projecting from the face of said other leg disposed toward said frame, said face having a pair of main winding terminals and a pair of power line terminals upstanding therefrom, said frame including means to permit access to said face upstanding terminals, and handles, electrically conducting link means connecting one line terminal to one contact of said overload switch, a second link means connecting the other overload switch contact to one side of the start winding and to one of said first start winding switch contacts, and a third link means connecting the other line terminal to one side of the said start winding and to the other side of said main winding, the start winding switch having a terminal connection between the other side of the start winding and second start winding switch contact, the terminal connections for both sides of said start winding being commonly positioned on said support.

2. A dynamoelectric machine comprising a frame, a stator mounted within said frame and carrying start and main windings having end turns projecting beyond the side faces of said stator, a single winding control unit arranged within said frame, said unit having a single piece generally L-shaped support formed of hardened electrically insulating material, one leg of said support extending toward one side face of said stator, means securing said support to said frame, said one leg having a chamber opening toward said frame, a start winding switch mounted within said chamber and insulated from said frame, the other leg of said support depending toward the axis of the machine axially beyond the associated end turns, said other leg including a chamber opening toward said stator for mounting an overload switch, a pair of main winding terminals and a pair of power line terminals upstanding from the face of said other leg disposed toward said frame, electrically conducting link means connecting one line terminal to one contact of said start winding switch and to one side of said start winding, and a second link means connecting the other line terminal to one side of the said start winding and to the other side of said main winding, the start winding switch having a terminal connection between the other side of the start winding and said second start winding switch contact, the terminal connections for both sides of said start winding being commonly positioned on said support.

3. A dynamoelectric machine comprising a frame, a stator mounted within said frame and carrying start and main windings having end turns projecting beyond the side faces of said stator, a single winding control unit arranged within said frame, said unit having a generally L-shaped support formed of hardened electrically insulating material, one leg of said support extending toward one side face of said stator means securing said support to said frame, said one leg having a chamber opening toward said frame, a start winding switch mounted within said chamber and insulated from said frame, the other leg of said support depending toward the axis of the machine axially beyond the associated end turns, said other leg including a chamber opening toward said stator, an overload switch mounted within said chamber having a pair of normally closed contacts, a manual reset insulator post rotatably carried by said other leg, and having an insulating wedge normally biased toward said contacts, a cover enclosing said overload switch chamber, said post terminating in a handle projecting from the face of said other leg disposed toward said frame, said face having at least a pair of main winding terminals and a pair of power line terminals upstanding therefrom, said frame including means permitting access to said terminals and handle.

4. A dynamoelectric machine comprising a frame, a stator mounted within said frame and carrying start and main windings having end turns projecting beyond the side faces of said stator, a single winding control unit arranged within said frame, said unit having a generally L-shaped support formed of hardened electrically insulating material, one leg of said support extending toward one side face of said stator between said winding end turns and frame, means securing said support to said frame, said one leg having a chamber opening toward said frame, a first winding switch mounted within said chamber and insulated from said frame, the other leg of said support depending toward the axis of the machine axially beyond the associated end turns, said other leg including a chamber opening toward said stator, a second winding switch mounted within said chamber, a cover enclosing said second switch chamber, and at least a pair of main winding terminals and a pair of power line terminals upstanding from the face of said other leg disposed toward said frame.

5. A dynamoelectric machine comprising a frame, a stator mounted within said frame and carrying start and main windings having end turns projecting beyond the side faces of said stator, a single winding control unit arranged within said frame, said unit having a solid generally L-shaped support formed of hardened electrically insulating material having first and second legs integrally joined at one end, said first leg extending toward one side face of said stator, said second leg projecting toward the axis of the machine, means securing said control unit within said frame, each leg having a chamber, a start winding switch having first and second contacts mounted within one of said chambers and an overload switch accommodated in the other chamber, means covering at least one of said chambers, one contact of said overload switch being connected by a first link means to a line terminal, a second link means connecting the other overload switch contact to one side of the start winding and said first start winding switch contact, and a third link means connecting one side of the said start winding and the other side of said main winding to a second line terminal, and the start winding switch having a terminal connection between the other side of the start winding and said second start winding switch contact.

References Cited by the Examiner

UNITED STATES PATENTS

| | | | |
|---|---|---|---|
| 2,279,214 | 4/1942 | Veinott | 318—221.1 |
| 2,495,189 | 1/1950 | Stein et al. | 318—221.7 |
| 2,583,590 | 1/1952 | Osterbus | 318—221.7 |
| 2,603,732 | 7/1952 | Hinman | 318—221.7 |
| 2,682,005 | 6/1954 | Hemphill | 310—68 |
| 2,972,708 | 2/1961 | Schaefer | 318—221 |
| 3,170,079 | 2/1965 | Jaeschke | 310—68 |

MILTON O. HIRSHFIELD, *Primary Examiner.*

J. D. MILLER, *Assistant Examiner.*